United States Patent
Gupta et al.

(10) Patent No.: US 12,132,960 B2
(45) Date of Patent: *Oct. 29, 2024

(54) SYSTEMS AND METHODS TO ENHANCE VIEWER PROGRAM EXPERIENCE DURING PROFILE MISMATCH

(71) Applicant: Rovi Guides, Inc., San Jose, CA (US)

(72) Inventors: Vikram Makam Gupta, Karnataka (IN); Vishwas Sharadanagar Panchaksharaiah, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,216

(22) Filed: Sep. 5, 2023

(65) Prior Publication Data

US 2023/0421849 A1 Dec. 28, 2023

Related U.S. Application Data

(63) Continuation of application No. 16/863,513, filed on Apr. 30, 2020, now Pat. No. 11,785,296.

(51) Int. Cl.
| | |
|---|---|
| *H04N 21/45* | (2011.01) |
| *H04N 21/454* | (2011.01) |
| *H04N 21/466* | (2011.01) |
| *H04N 21/482* | (2011.01) |

(52) U.S. Cl.
CPC ..... *H04N 21/4532* (2013.01); *H04N 21/4542* (2013.01); *H04N 21/4661* (2013.01); *H04N 21/4825* (2013.01); *H04N 21/4826* (2013.01); *H04N 21/4668* (2013.01)

(58) Field of Classification Search
None
See application file for complete search history.

(56) References Cited

U.S. PATENT DOCUMENTS

| | | |
|---|---|---|
| 11,785,296 B2 | 10/2023 | Gupta et al. |
| 2003/0172381 A1 | 9/2003 | Janevski |
| 2006/0174264 A1 | 8/2006 | Candelore |
| 2006/0206912 A1 | 9/2006 | Klarfeld et al. |
| 2012/0072382 A1* | 3/2012 | Pearson ................ H04L 67/535 709/224 |
| 2014/0189727 A1 | 7/2014 | Chen et al. |

(Continued)

FOREIGN PATENT DOCUMENTS

KR 20190024333 A 3/2019

*Primary Examiner* — James R Marandi
(74) *Attorney, Agent, or Firm* — Haley Guiliano LLP (57) ABSTRACT

A system and method of providing enhanced content, for example, when a viewer may not match with a program in order to make a viewer comfortable and encourage the viewer to continue to consume the program. The system accesses a viewer profile and accesses content to provide for consumption. The system calculates a match score for the content based on the viewer profile and determines if the match score is below a predetermined threshold. If the match score is lower than the threshold, the system generates an enhanced program from the content based on viewer profile and provides the enhanced program for consumption. Enhanced content may include omitting scenes with violence, modifying dialogue with vulgarities, focusing on scenes with preferred actors or setting, adding external content, and other modifications.

20 Claims, 7 Drawing Sheets

(56) References Cited

U.S. PATENT DOCUMENTS

| | | |
|---|---|---|
| 2017/0040002 A1 | 2/2017 | Basson et al. |
| 2018/0357306 A1 | 12/2018 | Osotio et al. |
| 2019/0104342 A1 | 4/2019 | Catalano et al. |
| 2021/0344999 A1 | 11/2021 | Gupta et al. |

* cited by examiner

| VIEWER PREFERENCES 510 | |
|---|---|
| GENRES 512 | DRAMA, ROMANCE, HOLIDAY |
| ACTORS 514 | BRADLEY COOPER, HUGH GRANT, MERYL STREEP |
| SETTINGS 516 | LONDON, PARIS, ANCIENT EGYPT, BEACHES |
| CHARACTERS 520 | STRONG FEM. LEAD, HEALTH PROFESSIONALS, MENTORS |
| SCENES DISLIKED 530 | GUN VIOLENCE, WAR, SPIDERS/BUGS |

FIG. 5A

| CONTENT METADATA 540 | |
|---|---|
| GENRES 542 | ACTION, DRAMA, SUPERHERO |
| ACTORS 544 | CHRIS PRATT, ZOE SALDANA, BRADLEY COOPER |
| SETTINGS 546 | SPACE, ALIEN PLANETS |
| CHARACTERS 560 | SUPERHEROES, STRONG FEM. LEAD, TEAM |
| THEMES 560 | TEAMWORK, FAMILY, DIVERSITY |

FIG. 5B

| SCENE METADATA 570 | |
|---|---|
| SCENE 571 | 034 |
| GENRES 572 | ACTION, SUPERHERO |
| ACTORS 574 | BRADLEY COOPER, VIN DIESEL |
| SETTING 576 | SPACESHIP, SPACE |
| CHARACTERS 580 | SUPERHEROES, SIDEKICKS |
| TAGS 590 | FRIENDSHIP, SPACE BATTLE |

SYSTEMS AND METHODS TO ENHANCE VIEWER PROGRAM EXPERIENCE DURING PROFILE MISMATCH

CROSS-REFERENCE TO RELATED APPLICATION

This application is a continuation of U.S. patent application Ser. No. 16/863,513, filed Apr. 30, 2020, the disclosure of which is hereby incorporated by reference herein in its entirety.

BACKGROUND

The present disclosure relates to systems for providing content, and more particularly to systems and related processes for providing enhanced content in order to encourage the viewer to continue to consume the content.

SUMMARY

A considerable amount of content is available for consumption, and this content is in a competition to attract potential audiences to both start and complete the content. Not only does content, such as video, animation, music, audiobooks, ebooks, playlists, podcasts, images, slideshows, games, text, and other media have to attract an audience, content must keep and sustain an audience. With competing content readily available, a content item has limited time to make an audience feel comfortable before an audience may decide to move on to other content.

Devices facilitate delivery of content for consumption at any time, as well as nearly in any place, which may decrease tolerance for content falling outside of an audience's usual preferences. Abilities of devices to provide content to a content consumer are often enhanced with the utilization of advanced hardware with increased memory and fast processors in devices. Devices, such as computers, telephones, smartphones, tablets, smartwatches, speakers/microphones (e.g., with a virtual assistant), activity trackers, e-readers, voice-controlled devices, servers, televisions, digital content systems, video game consoles, and other internet-enabled appliances can provide and deliver content almost instantly. If and when a viewer gives up on consuming a movie or show, there may be minimal wait-time before the next program is accessed and consumed.

Content delivery systems may use, for example, interactive content guidance applications to recommend content and facilitate content selection. Typically, viewer preferences are associated with a profile or an account such as a viewer profile, user profile, user account, subscriber profile, or a subscriber account. As used herein, "viewer" may be used as an equivalent to user account, subscriber account, or other account with content provider systems and/or services. Preferences may be stored as part of a user profile and may be referred to as a viewer profile. A viewer profile may be stored in the cloud (e.g., a remote-secure server) and accessed by interactive content guidance applications initiated by a viewer (e.g., logging-in).

Content preferences are valuable to a service and a viewer. By tracking content consumed by a viewer, an interactive content guidance application may identify similar content available and indicate recommended programs and episodes the viewer has yet to consume. Viewer preferences about content may be input manually or developed based on viewing histories. For instance, an interactive content guidance application may suggest another program based on similarities (or differences) to previously consumed content. For a content delivery service, tracking a viewing history may generate valuable data that can be used to aid in content suggestion algorithms.

In some approaches, recommendations of content are made to a viewer in order to keep the viewer consuming content with the service. Recommendations may lead to similar programs and content but do not, for example, broaden the horizons of the viewer. There exists a need to encourage viewers to consume programs outside of their comfort zones and typical viewer preferences, e.g., in order to satisfy and retain subscribers of a service or channel.

In some approaches, promotion of content outside of a match to a viewer profile may be met with skepticism, and the content will be left unfinished at the first sight of a scene not appealing to a particular viewer. For instance, an otherwise non-violent film may be stopped by a viewer seeing an introduction that includes a fight or weapons. For example, an action-adventure audiobook may be stopped when a romance is detailed early in the content. Sometimes, playback of a legal drama may be quit because of a scene featuring medical professionals. In order to attract and retain viewers, there exists a need to encourage viewers to continue to consume programs outside of their comfort zones until the viewer becomes comfortable with the content and decides to complete it.

In some embodiments described herein, a system is directed to enhancing a content item in order to make the content item more palatable to a viewer who would not typically be recommended the content item to encourage continued viewing. In some embodiments, a device (e.g., television) may identify that a viewer is present and watching the device. A device accesses the viewer's profile and determines if a selected program (e.g., movie) is not a match to the viewer's profile. If it is not a match, the system modifies or enhances the content for the particular viewer based on the profile. The modifications may be to, e.g., omit portions with violence, censor dialogue with vulgarities, play scenes (or episodes) out of order to highlight a character or setting, and/or pull in other content or information to supplement the content. Some embodiments of such a system may be utilized as an enhancement engine, e.g., as part of an interactive content guidance application, stored and executed by one or more of the memory and processors of a device or server to provide enhanced content.

In some embodiments described herein, enhancements of segments may be used for some duration or some episodes to, for example, reduce a difference between a correlation of a viewer profile and content metadata, so that the viewer does not leave or stop viewing the content. In some embodiments, enhancements may be gradually reduced as viewer watches for some time or some episodes. Enhancements may be personalized segments, and may be based on, for example, starting with segments/episodes based on a featured character (e.g., a primary protagonist) of a particular archetype or played by a preferred actor. Enhancements may include selecting segments/episodes based on a job or profession matching the viewer's preference. Enhancements may include selecting segments/episodes based on location to which the viewer has a connection. Other modifications may include matching genres, skipping scenes, re-ordering scenes, selecting a different episode or segment that might be a closer match to a viewer profile, and/or providing external content (e.g., which includes an interaction with a preferred character or actor) as non-episodic content.

For instance, in many procedural crime drama television programs, each episode begins with a crime scene featuring a victim of a brutal homicide, e.g., a bloody, gory depiction of a dead body. The primary focus of the shows is often the investigation of the crime and how cleverly the investigators catch the killer, but some gore may be included. When a certain viewer sees the gruesome crime scenes in the beginning, he or she may object to the blood and gore and might stop viewing the show on first sight. However, if a viewer watches for the full concept of the show (e.g., the entire criminal investigation by an intelligent team), the viewer will likely appreciate the program and the following episodes. If an enhancement engine were to at first censor or modify scenes with blood and gore that may turn viewers off to a show, then eventually, a viewer may not mind watching the program without any modifications.

In some embodiments, the enhancement engine may select scenes or episodes based on a featured character. For instance, in a criminal procedural television program, certain episodes may feature one or more characters more than others. In some episodes, a strong female lead character may crack the case. In some episodes, a favorite actor from another program may be involved as, e.g., an additional protagonist (or an antagonist). In one or more episodes, a character may be a preferred profession such as a nurse, lawyer, or teacher. In selecting content (or segments/scenes), an enhancement engine may enhance the content by providing episodes focusing on the preferred character earlier and/or extending the scenes with the preferred character. A viewer may begin watching a television program because of a profile match with one character, actor, or profession but soon grow to appreciate the other heroes and continue to view the program.

In some embodiments, the enhancement engine may select scenes or episodes based on a featured setting, such as a location, time period, or season. For instance, a viewer profile may identify that a viewer recently visited San Diego, and an enhancement engine may provide episodes or scenes that feature San Diego (or don't feature crimes in San Diego). Likewise, a viewer may prefer winter scenes or scenes occurring in the 1990s (e.g., in flashbacks). Viewer profiles may be used in various ways to establish a connection to a content item. A viewer may begin watching a television program because of a profile match with location, time period, or season but soon appreciate the story and continue to view the program.

Some embodiments may include genre-based enhancement: For instance, an enhancement engine may select scenes or segments of an episode based on a corresponding genre that is preferred by a viewer, in accordance with a viewer profile. For instance, a viewer may prefer scenes with a romance genre. If content being viewed is outside of the romance genre, scenes or segments qualifying as romance may be focused on and/or shown earlier than in their regular timeline. In some embodiments an enhancement engine can alter a timeline to create interest from the viewer.

In some embodiments, the enhancement engine may skip scenes during the beginning of a program or a few episodes that may be strongly disliked by a viewer, in accordance with a viewer profile. An enhancement engine may consider how it will impact a co-viewer when a scene or segment is omitted and may notify a user about the enhancement included to make a secondary viewer more comfortable viewing the program.

In some embodiments described herein, enhancements may be implemented for a secondary viewer but may stop if the secondary viewer leaves the room (or otherwise ceases to watch a program). For instance, when multiple viewers start to watch a content item, an enhancement engine may determine each viewer in the room and access the metadata of the content for comparison to the corresponding profiles. Such a determination may be performed, for instance, with device detection, smartphones, RFID smartcards, cameras, microphones, and/or other IoT and smart devices. An enhancement engine may access a profile of each discovered viewer that may describe a viewer's likes, interests, preferred genres, favorite actors, favorite locations, favorite programs, currently viewed shows, shows added to a watch-list, and other viewer profile fields. For each viewer, the enhancement engine may determine a match score between a program currently being watched and a user profile. For example, a higher score may indicate a program matching a primary viewer profile and lower score may indicating a program not matching a secondary viewer profile. Upon the enhancement engine detecting that the content metadata has a high match score for a primary viewer profile, but not a high match score for a secondary viewer profile, the enhancement engine may enhance program segments for some duration (or some episodes) to reduce the match score difference for the secondary viewer user so that second viewer does not quit watching the program with the primary viewer. Accordingly, a system may enhance a content item when the secondary viewer is present, in order to encourage the secondary viewer to watch more of the content item.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
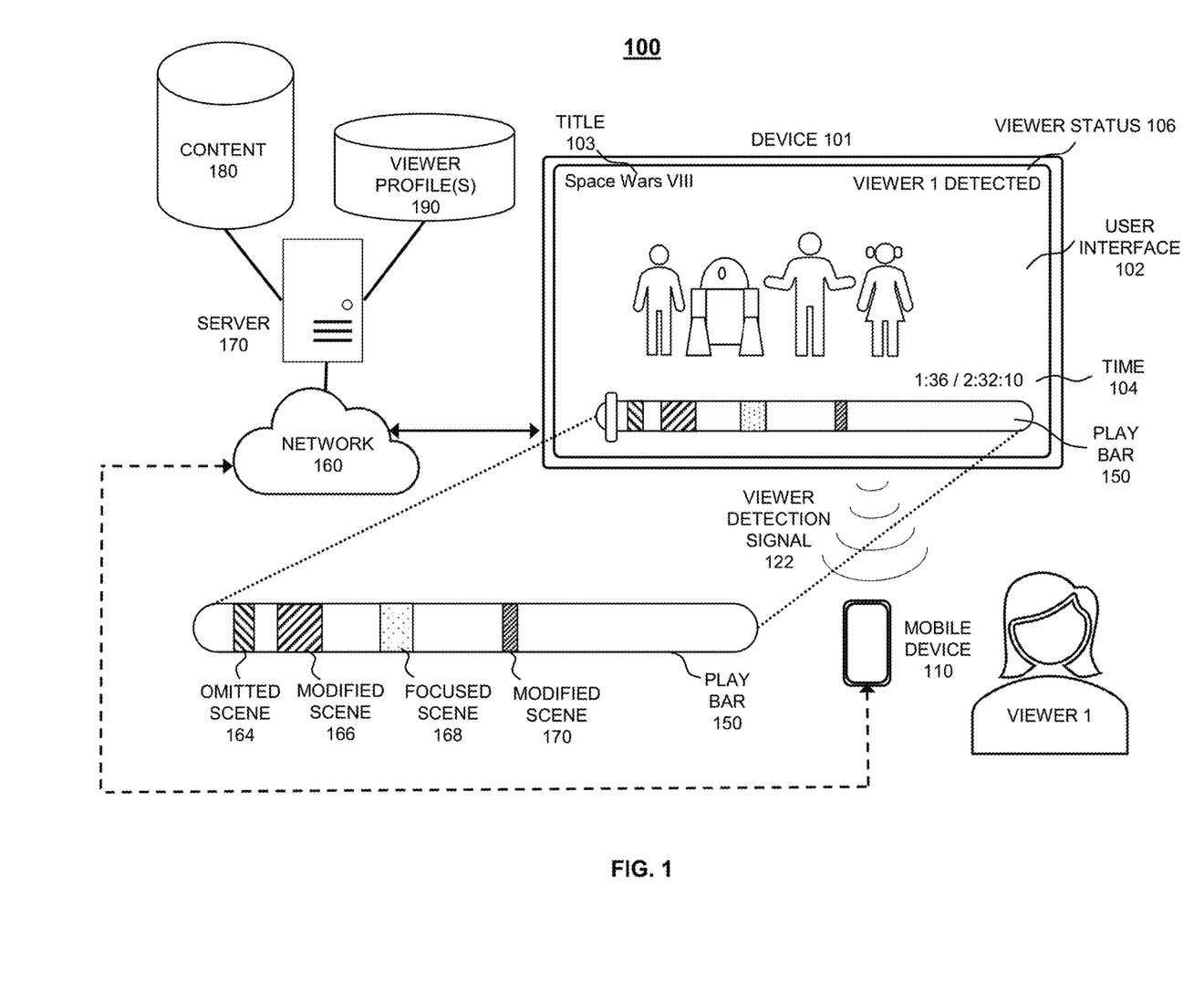
FIG. 1 depicts an illustrative scenario and user interfaces for providing enhanced content to encourage a viewer to continue to consume content, in accordance with some embodiments of the disclosure.

FIG. 1 depicts illustrative scenario 100 and user interfaces for providing enhanced content to encourage a viewer to continue to consume content, in accordance with some embodiments of the disclosure. Scenario 100 of FIG. 1 illustrates a content delivery system accessible by device 101 via network 160. In scenario 100, device 101 is illustrated as a smart television and mobile device 110 is illustrated as a smartphone. By way of a non-limiting example, scenario 100 may depict enhancing (or modifying) content to encourage a viewer to continue to consume the content in cases where, for instance, the content may not align with the viewer's preferences.

Figure 6:
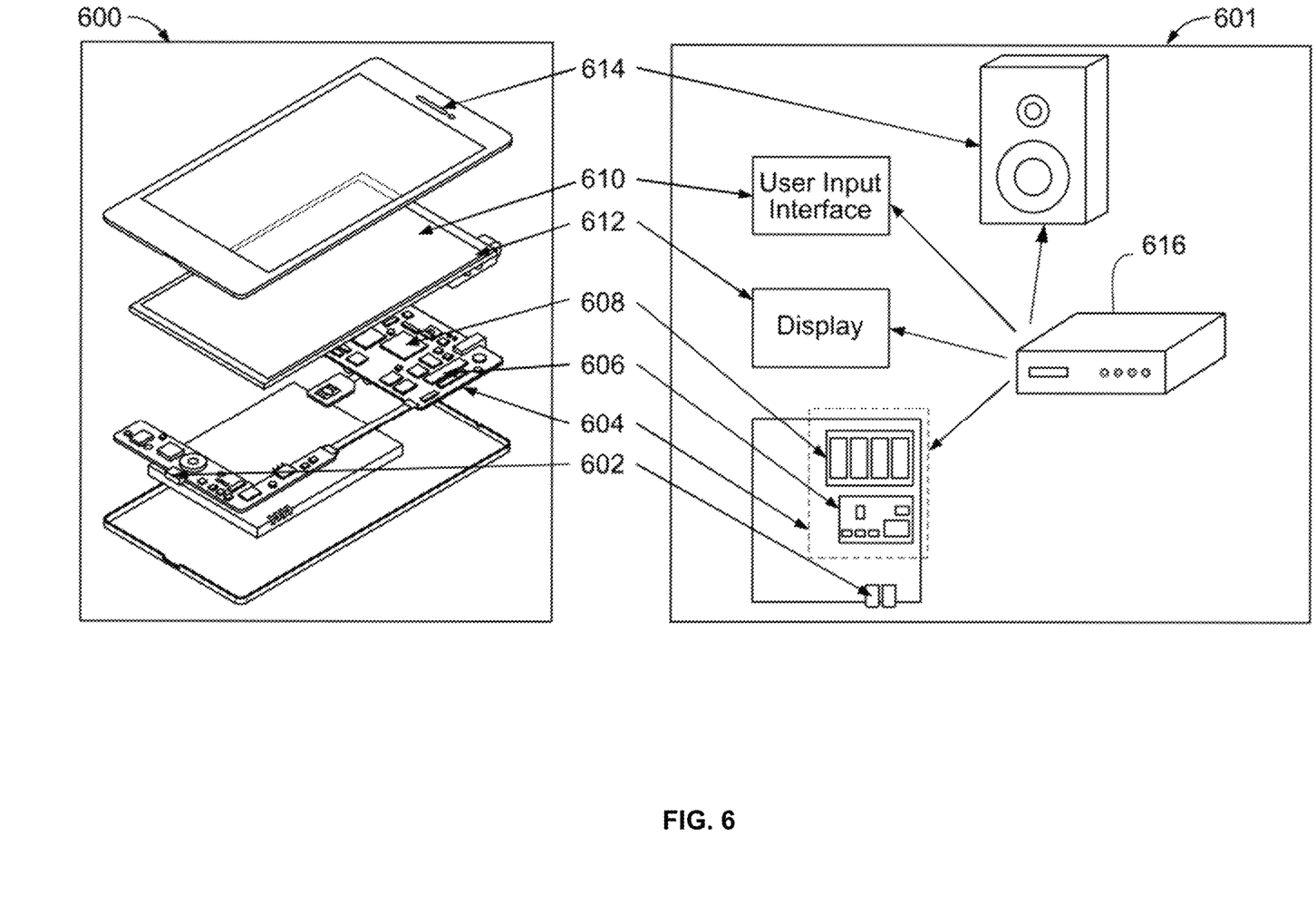
FIG. 6 is a diagram of an illustrative device, in accordance with some embodiments of the disclosure.
Figure 7:
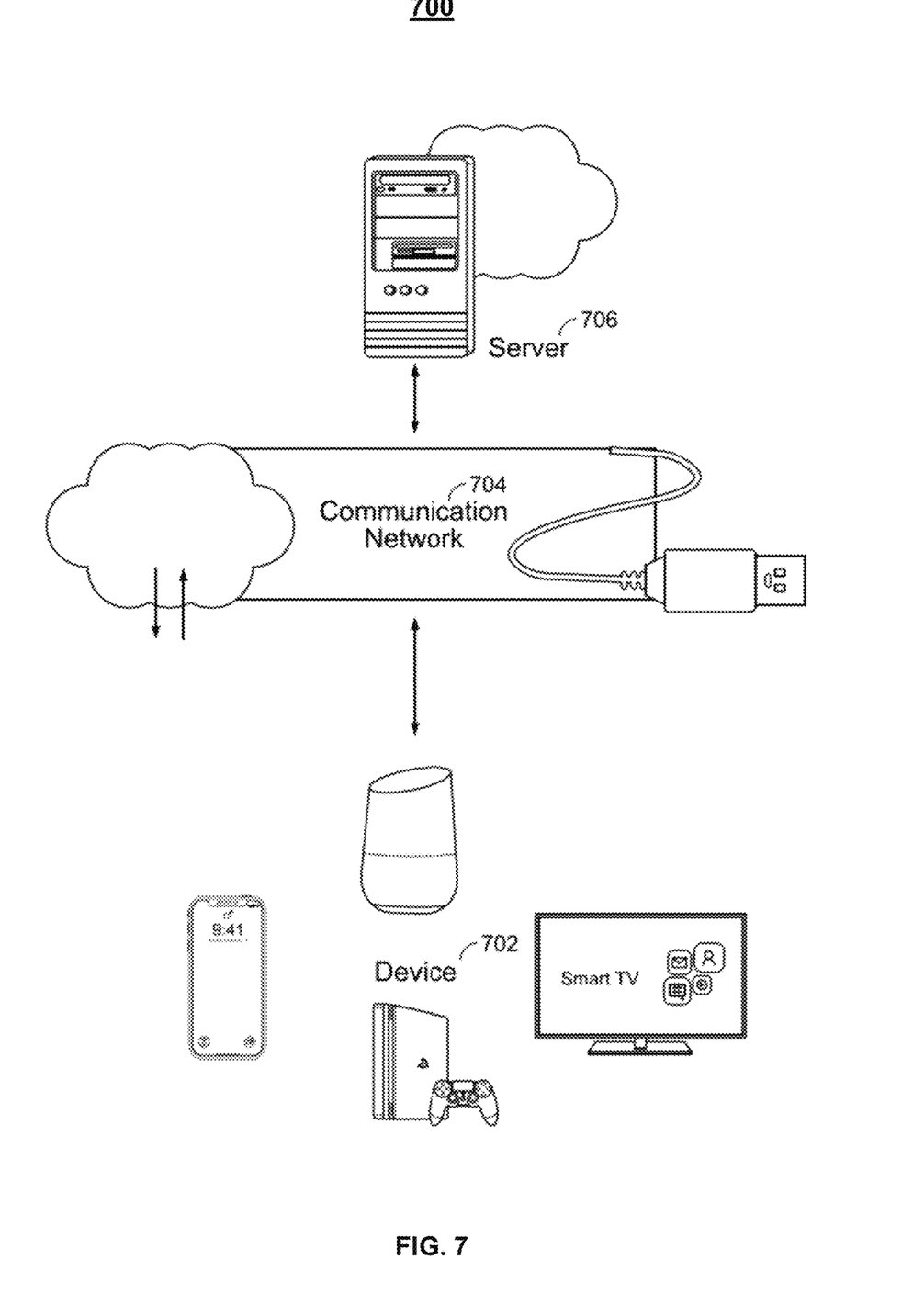
FIG. 7 is a diagram of an illustrative system, in accordance with some embodiments of the disclosure.

Each of device 101 may be any suitable device such as a television, personal computer, laptop, smartphone, tablet, media center, video console, or any device as depicted in FIGS. 6 and 7. Device 101 should have capabilities to receive input, communicate with a network, and provide content for consumption. Input for device 101 may be any suitable input interface such as a touchscreen, touchpad, or stylus and/or may be responsive to external device add-ons, such as a remote control, mouse, trackball, keypad, keyboard, joystick, voice recognition interface, or other user input interfaces. Some embodiments may utilize an enhancement engine, e.g., as part of an interactive content guidance application, stored and executed by one or more of the memory and processors of device 101 to provide enhanced content. Mobile device 110 is shown as an exemplary manner of detecting presence of a viewer in order to tailor the enhancements. Other devices and methods may be used to detect presence and identity of a viewer, including logging in to a user account. Mobile device 110 may be any device capable of communicating with device 101 as to identity and relative proximity of a viewer. Mobile device 110 may be, for instance, a smartphone, tablet, watch, remote control, keyboard, smartcard, etc.

Interactive content guidance applications may take various forms, such as interactive television program guides, electronic program guides (EPG) and/or user interfaces, which may allow users to navigate among and locate many types of content including conventional television programming (provided via broadcast, cable, fiber optics, satellite, internet (IPTV), or other modes) and recorded programs (e.g., DVRs) as well as pay-per-view programs, on-demand programs (e.g., video-on-demand systems), internet content (e.g., streaming media, downloadable content, webcasts, shared social media content, etc.), music, audiobooks, websites, animations, podcasts, (video) blogs, ebooks, and/or other types of media and content.

The interactive guidance provided may be for content available through a television, or through one or more devices, or it may bring together content available both through a television and through internet-connected devices using interactive guidance. The content guidance applications may be provided as online applications (e.g., provided on a website), or as stand-alone applications or clients on handheld computers, mobile telephones, or other mobile devices. Various devices and platforms that may implement content guidance applications are described in more detail below.

As shown in scenario 100, device 101 generates a graphical user interface, e.g., user interface 102. In scenario 100, user interface 102 displays content delivered via network 160 by server 170 from, e.g., content storage 180. User interface 102 may display time 104, which indicates progress of 1:36 of the runtime 2:32:10. User interface 102 may display title 103, which, for example, indicates the content item's title is "Space Wars VIII." User interface 102 may display viewer status 106 to indicate whether a viewer, e.g., "VIEWER 1," has been identified as consuming the content. In some embodiments, appearance of user interface 102 may occur as a result of input such as pause, resume, stop, other "trick play" functions or menu navigational input.

In some embodiments, user interface 102 may access a viewer profile in viewer profile database 190. Viewer profile database 190 may be an aggregator and/or retriever of multiple content delivery services. For instance, viewer profile database 190 may be able to access, download, and update viewer profiles via corresponding application programming interfaces (APIs) for each service. In some embodiments, viewer profile database 190 may have usernames and passwords stored for each individual. In some embodiments, viewer profile database 190 may have access limited to requesting profiles and enhanced content as needed, e.g., as a privacy concern.

In scenario 100, device 101 discovers the identity of viewer via viewer detection signal 122. In some embodiments, such as scenario 100, device 101 may emit viewer detection signal 122 to determine if any viewers (e.g., viewer devices) are within range. Using viewer detection signal 122 may be one of many approaches to detect presence and identity of a viewer. In some embodiments, an enhancement engine may infer that a particular viewer is consuming content via device 101 based on proximity of mobile device 110, e.g., as determined via viewer detection signal 122. Viewer detection signal 122 may be bidirectional. In some embodiments, viewer detection signal 122 may be one or more networks using Bluetooth, near-field communication (NFC), radio frequency, IEEE 802.11x (Wi-Fi), or other protocol(s). For instance, mobile device 110 may be a smartphone or NFC smartcard that relays an encoded viewer account. In some embodiments, viewer detection signal 122 may create a local area network and/or an ad-hoc network with mobile device 110. In some embodiments, viewer detection signal 122 may use pre-established Wi-Fi to communicate. In some embodiments, viewer detection signal 122 may include connecting to a common server by, e.g., accessing an activation website communicated by on-screen information, text message, QR codes, infrared, audio, or other communication. In some embodiments, a viewer may use a keypad and login to a viewer account, e.g., via infrared remote.

In scenario 100, device 101 discovers the identity of a viewer via viewer detection signal 122. In some embodiments, mobile device 110 may respond to viewer detection signal 122 from device 101 to acknowledge that a guest device is within range. For instance, device 101 and mobile device 110 may perform a handshake and/or communicate via viewer detection signal 122. A handshake may be used to exchange information in order to establish a protocol of communication prior to full communication. In some embodiments, mobile device 110 may emit viewer detection signal 122 to determine if any devices are within range and device 101 may acknowledge, e.g., via viewer detection signal 122. In such embodiments, privacy may be a concern, e.g., with subscription usernames and/or billing information, and data may be shared under pseudonyms or encrypted identifications. In some embodiments, device 101 and mobile device 110 may communicate via viewer detection signal 122. Device 101 and mobile device 110 may also communicate through a remote network, e.g., network 160 via server 170.

For instance, by way of a non-limiting example, a viewer may consume content, such as a movie, on a television, e.g., device 101. In such an example, device 101 may send a discovery signal to detect if any mobile devices are around, which may indicate that a particular viewer is viewing the playback on device 101. If a mobile device, e.g., mobile device 110, responds, device 101 may communicate with server 170 to deliver enhanced content for the respective viewer, e.g., "VIEWER 1."

Figure 5A:
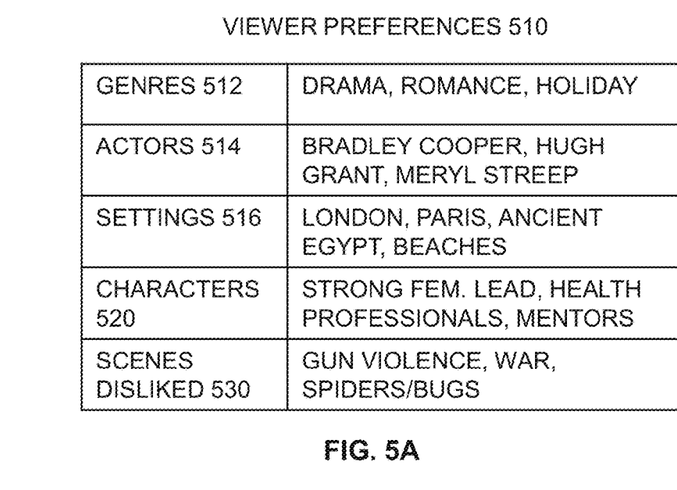
FIG. 5A depicts an illustrative table for viewer preferences, in accordance with some embodiments of the disclosure.
Figure 5B:
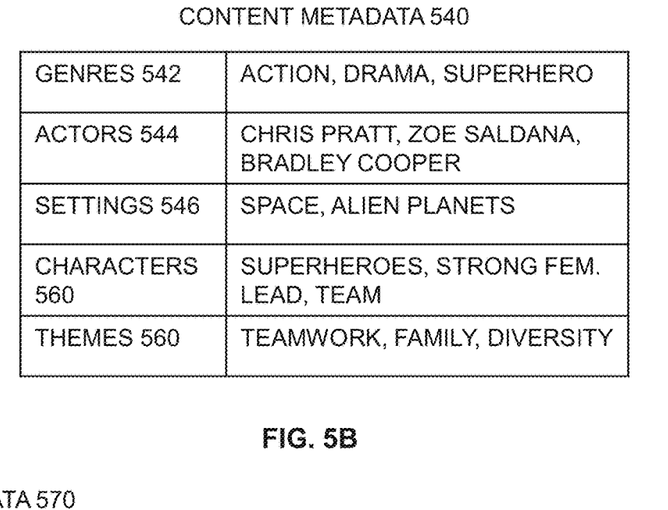
FIG. 5B depicts an illustrative table for content metadata, in accordance with some embodiments of the disclosure.
Figure 5C:
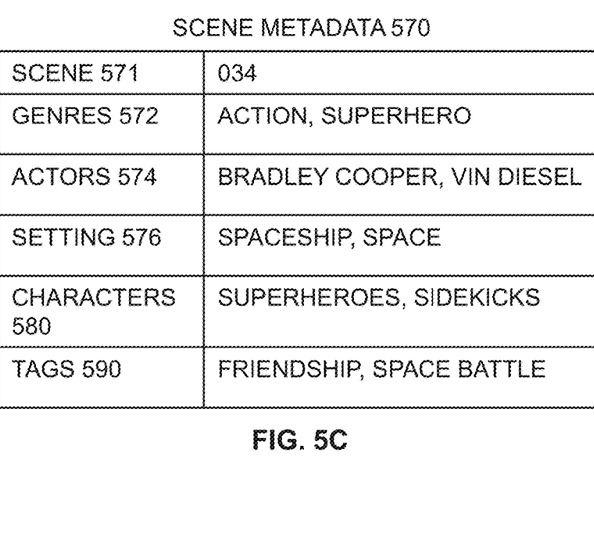
FIG. 5C depicts an illustrative table for scene metadata, in accordance with some embodiments of the disclosure.

Scenario 100 depicts exemplary play bar 150 in order to demonstrate potential enhancement of portions of content in some embodiments. In some embodiments, in a video program, such as a film or television episode, certain scenes may be edited, removed, modified, etc., in order to accommodate a viewer and encourage further consumption by the viewer. In some embodiments, the scene modifications and/or enhancements may be determined by the associated viewer profile. In some embodiments, scene metadata (e.g., as depicted in FIG. 5C) may be compared to viewer preferences (e.g., as depicted in FIG. 5A) in order to determine whether a scene needs to be deleted, shortened, extended, or otherwise modified. For example, omitted scene 164 may be omitted when a video is being enhanced for a viewer identified as "VIEWER 1," as the viewer would not enjoy a particularly violent fight scene, in accordance with her viewer profile. In some embodiments, scenes may be modified, such as modified scene 166, which may shorten a scene with, e.g., spaceship gun battles. A scene may be focused on a particular character or setting. For instance, focused scene 168 may include extended views of a mountainous planet or a particular accomplished actor preferred by VIEWER 1, in accordance with her viewer profile. Scenes may be otherwise modified, such as the case of modified scene 170, which may, e.g., have been a flashback scene moved to later in the story so that a viewer, such as VIEWER 1, may better remember a character's motivation in a following scene, in accordance with her viewer profile. Play bar 150 also depicts, for example, that enhanced scenes may occur more frequently in the beginning than towards the end because a viewer will likely be willing to watch scenes that may be undesirable after the viewer has invested in a majority of the content and would want to see how the program ends. In some embodiments, enhancement may occur throughout the content, e.g., uniformly or as needed.

Figure 2:
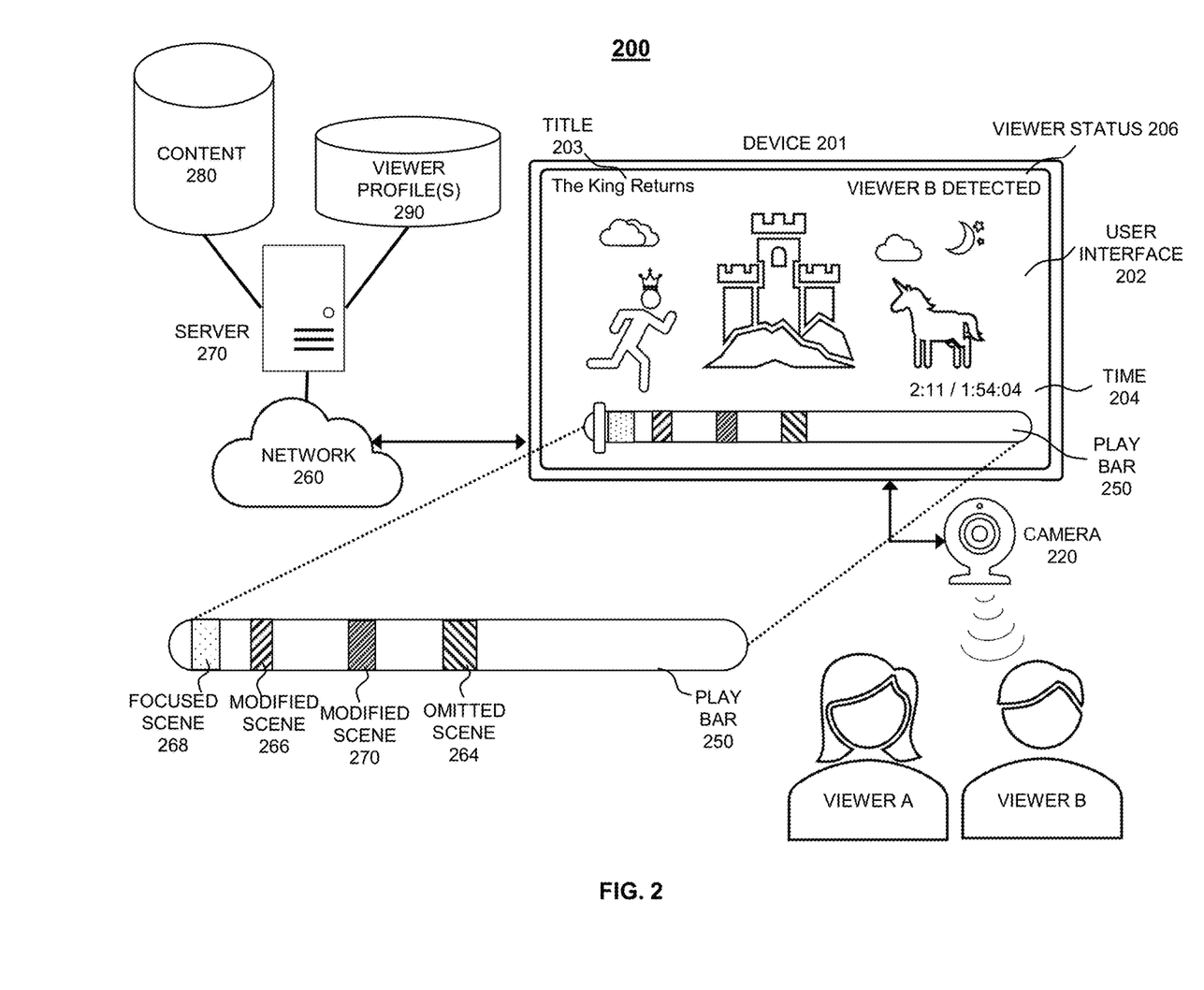
FIG. 2 depicts an illustrative scenario and user interfaces for providing enhanced content to encourage a viewer to continue to consume content preferred by a co-viewer, in accordance with some embodiments of the disclosure.

FIG. 2 depicts an illustrative scenario and user interfaces for providing enhanced content to encourage a viewer to continue to consume content preferred by a co-viewer, in accordance with some embodiments of the disclosure. Scenario 200 of FIG. 2 illustrates a content delivery system accessible by device 201 via network 260. In scenario 200, device 201 is illustrated as a smart television. By way of a non-limiting example, scenario 200 may depict enhancing (or modifying) content to encourage a viewer to continue to consume the content in cases where, for instance, the content may not align with the viewer's preferences but may be preferred by a primary viewer.

Each of device 201 may be any suitable device such as a television, personal computer, laptop, smartphone, tablet, media center, video console, or any device as depicted in FIGS. 6 and 7. Some embodiments may utilize an enhancement engine, e.g., as part of an interactive content guidance application, stored and executed by one or more of the memory and processors of device 201 to provide enhanced content. Scenario 200 may include camera 220 which may be used to identify one or more viewers. In some embodiments, camera 220 may track viewers entering and/or leaving the area. In some embodiments, camera 220 may be substituted (or supplemented) with any device capable of communicating with device 201 as to identity and relative proximity of a viewer.

As shown in scenario 200, device 201 generates a graphical user interface, e.g., user interface 202. In scenario 200, user interface 202 displays content delivered via network 260 by server 270 from, e.g., content storage 280. User interface 202 may display time 204, which indicates progress of 2:11 of the runtime 1:54:04. User interface 202 may display title 203, which, for example, indicates the content item's title is "The King Returns." User interface 202 may display viewer status 206 to indicate whether a viewer, e.g., "VIEWER B," has been identified as consuming the content.

In some embodiments, user interface 202 may access a viewer profile in viewer profile database 290. Viewer profile database 290 may be, for instance, an aggregator and/or retriever of multiple content delivery services, and viewer profile database 290 may be able to access, download, and update viewer profiles via corresponding APIs for each service.

In scenario 200, camera 220 may detect and identify one or more viewers. In some embodiments, camera 220 may monitor for movement to determine if any viewers (e.g., viewer devices) have come within or left range. Some embodiments may use one or more other methods to determine if one or more viewers are present. For instance, viewer detection signal 122 of scenario 100 depicted in FIG. 1 may be substituted for (or supplemented with) camera 220. In some embodiments, camera 220 may also be able to track eye movements to tell if one or more viewers are watching device 201.

In scenario 200, device 201 discovers the identity of a viewer via camera 220. In some embodiments, device 201, camera 220, server 270, and/or viewer profile database 290 may be used to determine the identity of one or more viewers. In scenario 200, camera 220 identifies two viewers who are, e.g., a primary viewer and a secondary viewer. In some embodiments a primary viewer may be determined to be the viewer selecting the content (e.g., providing input). In some embodiments, a primary viewer may be determined by the enhancement engine as the viewer who best matches the content, e.g., by correlation of viewer profile and the content metadata.

For instance, by way of a non-limiting example, in scenario 200, the content may be recommended for "VIEWER A" and modified/enhanced for "VIEWER B," in order to encourage VIEWER B to continue to watch with VIEWER A. In some embodiments, camera 220 may detect that VIEWER B is in the room or not. In some embodiments, camera 220 may detect that VIEWER B is watching device 201 or not. The enhancement engine may provide enhanced content if VIEWER B is detected as present and/or viewing content via device 201.

Scenario 200 depicts exemplary play bar 250 in order to demonstrate potential enhancements of portions of content in some embodiments. In some embodiments, in a video program, such as a film or television episode, certain scenes may be edited, removed, modified, etc. in order to accommodate a viewer and encourage further consumption by the viewer. In some embodiments the scene modifications and/or enhancements may be determined by the associated viewer profile. For example, a scene may be focused on a particular character or setting. For instance, focused scene 268 may include extended views of a city recently visited by VIEWER B or a particular actor/actress that VIEWER B enjoys. In some embodiments, scenes may be modified for VIEWER B, such as modified scene 266, which may shorten a scene with a disliked political or religious discussion, in accordance with his viewer profile. Scenes may be otherwise modified, such as the case of modified scene 270, which may, e.g., have been an argument scene moved to earlier in the story so that a viewer may see confrontation sooner. In some embodiments, a portion of content, such as a scene, may be skipped. For instance, omitted scene 264 may be omitted when a video is being enhanced for a viewer identified as "VIEWER B," as the viewer would not enjoy a particular romantic scene. Play bar 250 also depicts, for example, that enhanced scenes may occur more frequently in the beginning than towards the end, because a viewer will likely be willing to watch undesirable scenes in order to see the ending.

Figure 3:
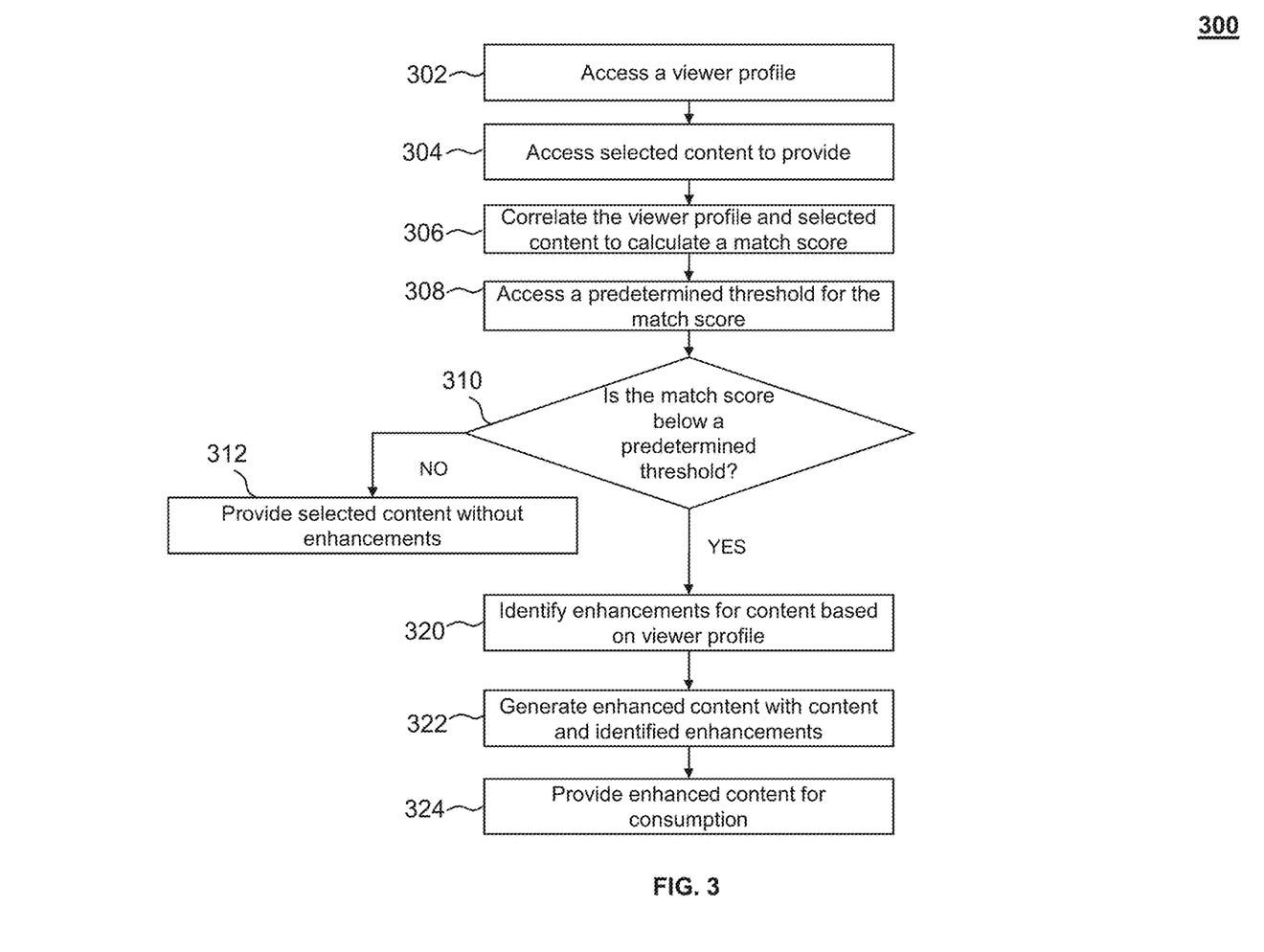
FIG. 3 depicts an illustrative flowchart of a process for providing enhanced content to encourage a viewer to continue to consume content, in accordance with some embodiments of the disclosure.

FIG. 3 depicts an illustrative flowchart of a process for providing enhanced content to encourage a viewer to continue to consume content, in accordance with some embodiments of the disclosure. Some embodiments may utilize an enhancement engine, e.g., as part of an interactive content guidance application, stored and executed by one or more of the memory and processors of a device and/or server such as those depicted in FIGS. 1, 2, 6 and 7.

At step 302, an enhancement engine accesses a viewer profile. For example, in scenario 100, device 101 may access a viewer profile from viewer profile database 190. In some embodiments, a viewer profile database may be an aggregator and/or updater of multiple content delivery services. For instance, an enhancement engine may be able to access, download, and update viewer profiles in one or more viewer profile databases via corresponding APIs for each service. Some embodiments may include, for instance, viewer preferences 510 as depicted in FIG. 5A.

At step 304, the enhancement engine accesses content to provide for consumption. For example, in scenario 100, device 101 may access content from content storage 180 via network 160 and server 170. In some embodiments, content may be selected to be provided. In some embodiments content may be recommended by a content provider or other service to be provided, e.g., as part of a promotion. Some embodiments may include, for instance, content metadata 540 as depicted in FIG. 5B.

At step 306, the enhancement engine calculates a match score for the content based on the viewer profile. There are many ways to calculate a match score between a viewer and a content item. In some embodiments, a match score may be a measure of fit for a viewer and a content item. For example, a match score may measure a correlation between a viewer's preferences and content metadata. Some embodiments may include, for instance, comparing viewer preferences 510 as depicted in FIG. 5A with content metadata 540 as depicted in FIG. 5B. A match score may be calculated as a score based on, e.g., a count of matches between a viewer's preferences and content metadata. In some embodiments, a match score may be, e.g., a rating on a scale of 1 to 3, a value from 0 to 10.0, a normalized percentage from 0 to 100%, and/or other scales.

At step 308, the enhancement engine accesses a predetermined threshold to compare to the match score. A threshold may be used to determine whether a content item sufficiently matches a viewer's preferences or, e.g., if a match score is too low, then enhancements may be needed to encourage further viewing. In scenarios 100 and 200, for instance, a content item may have similarities with a viewer's preferences, but there may also be one or more differences that may typically turn a viewer away from consuming such content. A threshold may be predetermined to allow the enhancement engine to identify when enhancements will be needed. A predetermined threshold may be a threshold for a specific viewer, all viewers, or a subset of viewers. In some embodiments, a predetermined threshold may be stored and accessed from content storage 180 or viewer profile database 190 via server 170. In some embodiments, a predetermined threshold may be stored and accessed from other storage or memory via server 170. For example, a predetermined threshold may be 65 on a 1-100 scale, and a match score below 65 would trigger enhancements to the content. For more picky viewers, a predetermined threshold may be higher, e.g., 85 on a 1-100 scale. A predetermined threshold may incorporate a range where, for instance, if a match score were to be below a lower bound, enhancements would not be made. For instance, if a threshold included an upper bound of 75 and lower bound of 35 on a 1-100 scale, a match score below 35 may not trigger enhancements. In such a case, for instance, a content item would be too enhanced and missing too many scenes, elements, characters, etc. In some embodiments, an enhancement engine may incorporate multiple thresholds to incorporate tiers of enhancements. For example, a first predetermined threshold may be 88 on a 1-100 scale, which may trigger fewer or certain types of enhancements for the content, and a second predetermined threshold may be 65 on a 1-100 scale, which may trigger more (or all) types of enhancements.

If the match score is determined to be above (or equal to) the predetermined threshold at step 310, the enhancement engine provides the selected content without enhancements, at step 312, for the duration of the content. For example, if a predetermined threshold is 85 on a 1-100 scale, and the match score is 87, then the content may be provided without enhancement.

If the match score is determined to be below the predetermined threshold at step 310, the enhancement engine identifies enhancements for the content based on the viewer profile at step 320. The enhancements are based on the viewer profile and designed to encourage continued consumption of the content. For example, if a predetermined threshold is 85 on a 1-100 scale, and the match score is 82, then the content may be provided with enhancements.

At step 322, the enhancement engine generates an enhanced program from the content and the identified enhancements. In some embodiments, enhancements may come in various forms to, e.g., supplement scenes or portions of the content. For example, scenario 100 of FIG. 1 depicts an exemplary play bar 150 in order to demonstrate potential enhancement of portions of content in some embodiments. In some embodiments, in a video program, such as a film or television episode, certain scenes may be edited, removed, modified, etc., in order to accommodate a viewer and encourage further consumption by the viewer. In some embodiments, the scene modifications and/or enhancements may be determined by the associated viewer profile. Play bar 150 depicts, for instance, omitted scene 164, modified scene 166, focused scene 168, and modified scene 170, each of which have been edited, modified, or skipped, in accordance with the viewer profile.

At step 324, the enhancement engine provides the enhanced program for consumption. For instance, in scenario 100, the content titled "Space Wars VIII" is provided to VIEWER 1 with enhancements depicted in, e.g., play bar 150.

Figure 4:
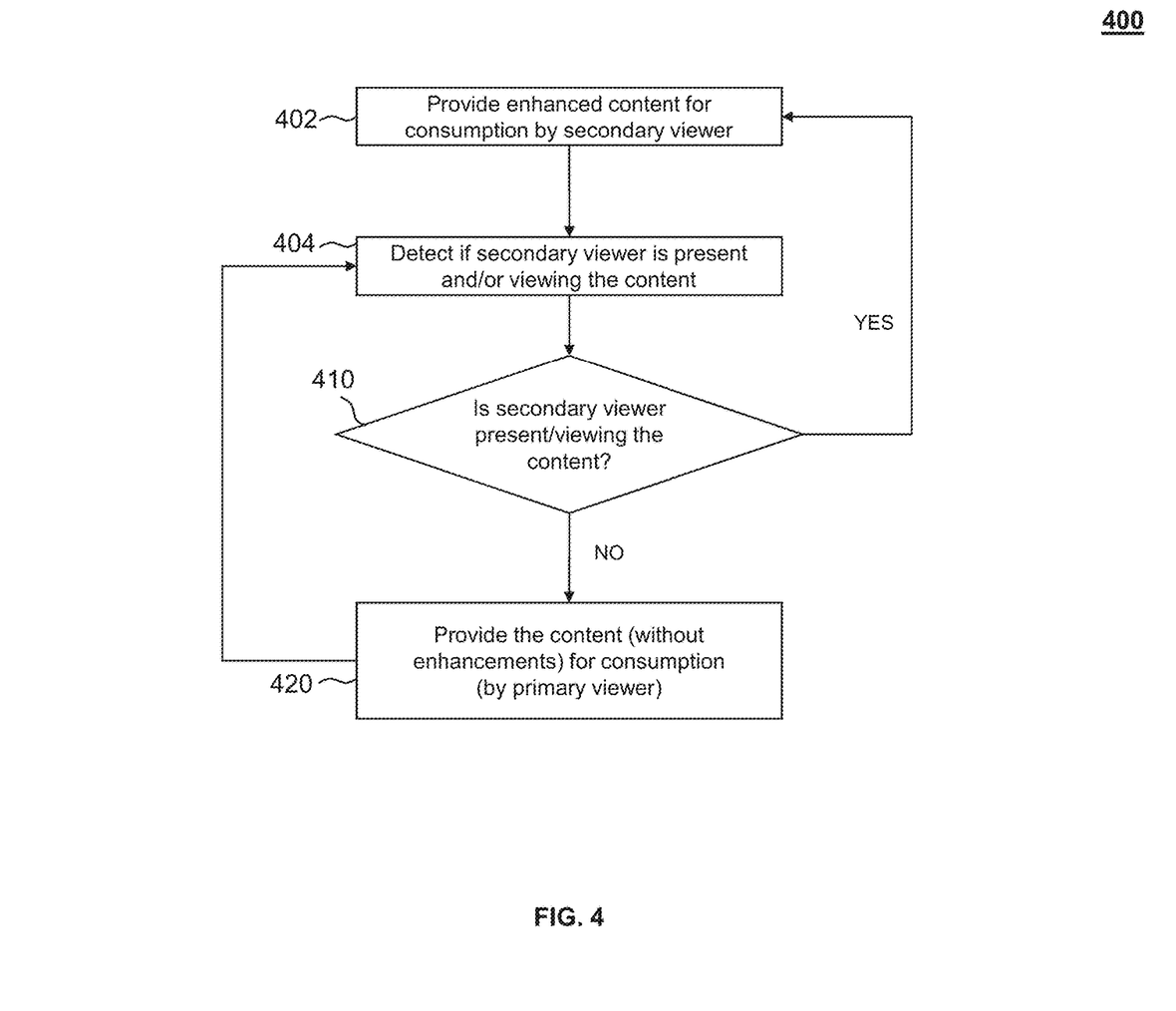
FIG. 4 depicts an illustrative flowchart of a process for providing enhanced content to encourage a viewer to continue to consume content, in accordance with some embodiments of the disclosure.

FIG. 4 depicts an illustrative flowchart of a process for providing enhanced content to encourage a viewer to continue to consume content, in accordance with some embodiments of the disclosure. Some embodiments may utilize an enhancement engine, e.g., as part of an interactive content guidance application, stored and executed by one or more of the memory and processors of a device and/or server.

At step 402, an enhancement engine provides enhanced content for consumption by a secondary viewer. For instance, by way of a non-limiting example, in scenario 200, the content may be recommended for VIEWER A and modified/enhanced for VIEWER B, in order to encourage VIEWER B to continue to watch with VIEWER A. Content may be, e.g., enhanced through process 300 depicted in FIG. 3. Scenario 200 of FIG. 2 depicts an exemplary play bar 250 in order to demonstrate potential enhancements of portions of content in some embodiments.

At step 404, the enhancement engine detects if the secondary viewer is present and/or viewing the content. In scenario 200, for example, camera 220 identifies two viewers who are, e.g., a primary viewer (VIEWER A) and a secondary viewer (VIEWER B). In some embodiments, such as scenario 200, camera 220 may detect that VIEWER B is in the room or not. In some embodiments, camera 220 may detect that VIEWER B is watching device 201 or not by, e.g., tracking eye movement. In some embodiments, viewer detection signal 122 of scenario 100 depicted in FIG. 1 may be substituted for (or supplemented with) camera 220 to detect the presence of and identify a particular viewer.

At step 410, the enhancement engine determines if the secondary viewer is detected as present and/or viewing the content. If the secondary viewer is detected as present and/or viewing the content, then the enhancement engine continues to provide enhanced content for consumption by a secondary viewer, at step 402. For instance, in scenario 200, if camera 220 detects VIEWER B in the room and/or viewing, then enhanced content is provided to the viewers.

If the secondary viewer is not detected as present and/or viewing the content then the enhancement engine provides non-enhanced content for consumption, e.g., by the primary viewer, at step 420. This may indicate that, regarding scenario 200, VIEWER B may not be present (or, e.g., fell asleep). In scenario 200, non-enhanced content would be delivered from content storage 280 via server 270 and network 260. In such a scenario without VIEWER B, play bar 250 may not include modified scenes or skip certain scenes. While the enhancement engine provides non-enhanced content, the enhancement engine detects if the secondary viewer, e.g., comes back, and is present and/or viewing the content at step 404.

FIG. 5A depicts an illustrative table for viewer preferences, in accordance with some embodiments of the disclosure. In some embodiments, viewer preferences 510 depicts preference data for a viewer regarding content. In some embodiments, viewer preferences 510 may be part of a viewer profile, which may be stored in a viewer profile database, such as viewer profile database 190 of FIG. 1. Viewer preferences 510 may be a data structure including fields with information. For instance, Genres field 512 includes "Drama, Romance, Holiday"; Actors field 514 includes "Bradley Cooper, Hugh Grant, Meryl Streep"; Settings field 516 includes London, Paris, Ancient Egypt, Beaches"; Characters field 520 includes Strong Fem. Lead, Health Professionals, Mentors"; and Scenes Disliked field 530 includes "Gun Violence, War, Spiders/Bugs."

FIG. 5B depicts an illustrative table for content metadata, in accordance with some embodiments of the disclosure. In some embodiments, content metadata (e.g., as depicted in FIG. 5B) may be compared to viewer preferences (e.g., as depicted in in FIG. 5A) in order to determine a match score. In some embodiments, content metadata 540 may be associated with content, which may be stored in a database, such as content storage 180 of FIG. 1. Content metadata 540 may be stored as part of a data structure including fields with information. For instance, Genres field 542 includes "Action, Drama, Superhero"; Actors field 544 includes "Chris Pratt, Zoe Saldana, Bradley Cooper"; Settings field 546 includes "Space, Alien Planets"; Characters field 560 includes "Superheroes, Strong Fem. Lead, Team"; and Themes field 560 includes "Teamwork, Family, Diversity."

FIG. 5C depicts an illustrative table for scene metadata, in accordance with some embodiments of the disclosure. In some embodiments, scene metadata (e.g., as depicted in FIG. 5C) may be compared to viewer preferences (e.g., as depicted in FIG. 5A) in order to determine whether a scene needs to be deleted, shortened, extended, or otherwise modified. In some embodiments, scene metadata 570 may be associated with content, which may be stored in a database, such as content storage 180 of FIG. 1. Scene metadata 570 may be stored as part of a data structure including fields with information. For instance, Scene field 571 includes "034"; Genres field 572 includes "Action, Superhero"; Actors field 574 includes "Bradley Cooper, Vin Diesel"; Setting field 576 includes "Spaceship, Space"; Characters field 580 includes "Superheroes, Sidekicks"; and Tags field 590 includes "Friendship, Space Battle."

FIG. 6 is a diagram of an illustrative device, in accordance with some embodiments of the disclosure. Device 600 may be implemented by a device or system, e.g., a device providing a display to a user, or any other suitable control circuitry configured to generate a display to a user of content. For example, device 600 of FIG. 6 can be implemented as equipment 601. In some embodiments, equipment 601 may include set-top box 616 that includes, or is communicatively coupled to, display 612, audio equipment 614, and user input interface 610. In some embodiments, display 612 may include a television display or a computer display. In some embodiments, user interface input 610 is a remote-control device. Set-top box 616 may include one or more circuit boards. In some embodiments, the one or more circuit boards include processing circuitry, control circuitry, and storage (e.g., RAM, ROM, Hard Disk, Removable Disk, etc.). In some embodiments, circuit boards include an input/output path. Each one of device 600 and equipment 601 may receive content and receive data via input/output (hereinafter "I/O") path 602. I/O path 602 may provide content and receive data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communication paths (described below). I/O functions may be provided by one or more of these communication paths but are shown as a single path in FIG. 6 to avoid overcomplicating the drawing. While set-top box 616 is shown in FIG. 6 for illustration, any suitable computing device having processing circuitry, control circuitry, and storage may be used in accordance with the present disclosure. For example, set-top box 616 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for an application enhancement engine stored in memory (e.g., storage 608). Specifically, control circuitry 604 may be instructed by the application to perform the functions discussed above and below. For example, the application may provide instructions to control circuitry 604 to generate the content guidance displays. In some implementations, any action performed by control circuitry 604 may be based on instructions received from the application.

In some client/server-based embodiments, control circuitry 604 includes communications circuitry suitable for communicating with an application server. An enhancement engine may be a stand-alone application implemented on a device or a server. An enhancement engine may be implemented as software or a set of executable instructions. The instructions for performing any of the embodiments discussed herein of the enhancement engine may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 6, the instructions may be stored in storage 608, and executed by control circuitry 604 of a device 600.

In some embodiments, an enhancement engine may be a client/server application where only the client application resides on device 600 (e.g., device 702), and a server application resides on an external server (e.g., server 706). For example, an enhancement engine may be implemented partially as a client application on control circuitry 604 of device 600 and partially on server 706 as a server application running on control circuitry. Server 706 may be a part of a local area network with device 702 or may be part of a cloud computing environment accessed via the internet. In a cloud computing environment, various types of computing services for performing searches on the internet or informational databases, providing storage (e.g., for the keyword-topic database) or parsing data are provided by a collection of network-accessible computing and storage resources (e.g., server 706), referred to as "the cloud." Device 600 may be a cloud client that relies on the cloud computing capabilities from server 706 to access profiles, enhance content items, and provide content by the enhancement engine. When executed by control circuitry of server 706, the enhancement engine may instruct the control circuitry to generate the enhancement engine output (e.g., content items and/or indicators) and transmit the generated output to device 702. The client application may instruct control circuitry of the receiving device 702 to generate the enhancement engine output. Alternatively, device 702 may perform all computations locally via control circuitry 604 without relying on server 706.

Control circuitry 604 may include communications circuitry suitable for communicating with an enhancement engine server, a quotation database server, or other networks or servers. The instructions for carrying out the above-mentioned functionality may be stored and executed on the application server 706. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device such as storage 608 which is part of control circuitry 604. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 608 may be used to store various types of content described herein as well as content guidance data described above. Nonvolatile memory may also be used (e.g., to launch a boot-up routine and other instructions). Cloud-based storage, for example, (e.g., on server 706) may be used to supplement storage 608 or instead of storage 608.

A user may send instructions to control circuitry 604 using user input interface 610. User input interface 610, e.g., via display 612, may be any suitable interface such as a touchscreen, touchpad, or stylus and/or may be responsive to external device add-ons, such as a remote control, mouse, trackball, keypad, keyboard, joystick, voice recognition interface, or other user input interfaces. Display 612 may include a touchscreen configured to provide a display and receive haptic input. For example, the touchscreen may be configured to receive haptic input from a finger, a stylus, or both. In some embodiments, equipment device 600 may include a front-facing screen and a rear-facing screen, multiple front screens, or multiple angled screens. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 616.

Audio equipment 614 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Speakers 614 may be provided as integrated with other elements of each one of device 600 and equipment 601 or may be stand-alone units. An audio component of videos and other content displayed on display 612 may be played through speakers of audio equipment 614. In some embodiments, audio may be distributed to a receiver (not shown), which processes and outputs the audio via speakers of audio equipment 614. In some embodiments, for example, control circuitry 604 is configured to provide audio cues to a user, or other audio feedback to a user, using speakers of audio equipment 614. Audio equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604.

An application (e.g., for generating a display) may be implemented using any suitable architecture. For example, a stand-alone application may be wholly implemented on each one of device 600 and equipment 601. In some such embodiments, instructions of the application are stored locally (e.g., in storage 608), and data for use by the application is downloaded on a periodic basis (e.g., from an out-of-band feed, from an internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may monitor the words the user inputs in his/her messages for keywords and topics. In some embodiments, control circuitry 604 monitors user inputs such as texts, calls, conversation audio, social media posts, etc., to detect keywords and topics. Control circuitry 604 may store the detected input terms in a keyword-topic database and the keyword-topic database may be linked to the user profile. Additionally, control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

In some embodiments, the application is a client/server-based application. Data for use by a thick or thin client implemented on each one of device 600 and equipment 601 is retrieved on demand by issuing requests to a server remote from each one of device 600 and equipment 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to device 600 for presentation to the user.

As depicted in FIG. 7, device 702 may be coupled to communication network 704. Communication network 704 may be one or more networks including the internet, a mobile phone network, mobile voice or data network (e.g., a 5G or 4G or LTE network), cable network, public switched telephone network, Bluetooth, or other types of communication network or combinations of communication networks. Thus, device 702 may communicate with server 706 over communication network 704 via communications circuitry described above. In should be noted that there may be more than one server 706, but only one is shown in FIG. 7 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communication path or combination of such paths.

In some embodiments, the application is downloaded and interpreted or otherwise run by an interpreter or virtual machine (e.g., run by control circuitry 604). In some embodiments, the application may be encoded in the ETV Binary Interchange Format (EBIF), received by control circuitry 604 as part of a suitable feed, and interpreted by a user agent running on control circuitry 604. For example, the application may be an EBIF application. In some embodiments, the application may be defined by a series of JAVA-based files that are received and run by a local virtual machine or other suitable middleware executed by control circuitry 604.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of providing modified content, the method comprising:
    providing content to be consumed by a primary viewer, the content comprising a plurality of scenes each with corresponding metadata;

accessing a viewer profile of a secondary viewer;
determining that the secondary viewer is present with the primary viewer during the providing of the content;
determining a genre match score for the content based on the viewer profile of the secondary viewer indicating a genre preference of the secondary viewer;
modifying at least one of the plurality of scenes based on the determined genre match score for the content and the genre preference of the secondary viewer; and
providing the modified at least one of the plurality of scenes for consumption while the secondary viewer is present with the primary viewer.

2. The method of claim 1 further comprising:
determining the secondary viewer is no longer present for the providing of content; and
in response to determining that the secondary viewer is no longer present, providing the content for consumption while no longer providing the one of the plurality of modified scenes for consumption.

3. The method of claim 1, wherein modifying at least one of the plurality of scenes based on the determined genre match score for the content and the genre preference of the secondary viewer comprises:
determining whether the genre match score is below a predetermined threshold; and
in response to determining that the genre match score is below the predetermined threshold:
accessing scene metadata for one of the plurality of scenes.

4. The method of claim 1 further comprising generating a play bar that indicates when the at least one of the plurality of modified scenes will be implemented.

5. The method of claim 1 further comprising accessing a viewer profile of the primary viewer, wherein the viewer profile of the primary viewer identifies the content as preferred, and the providing the at least one of the plurality of modified scenes comprises providing the at least one of the plurality of modified scenes from the content based on the viewer profile of the secondary viewer and the viewer profile of the primary viewer.

6. The method of claim 1, wherein the modification comprises removing a portion of the content.

7. The method of claim 1, wherein the modification comprises accessing additional content and adding the additional content to the content.

8. The method of claim 1, wherein the modification comprises altering or removing explicit language.

9. The method of claim 1, wherein the modification comprises reordering portions of the content.

10. The method of claim 9, wherein reordering portions of the content further comprises prioritizing portions of the content having a particular character or particular location, based on the viewer profile of the secondary viewer.

11. A system for providing modified content, the system comprising:
a memory; and
control circuitry configured to:
provide content to be consumed by a primary viewer, the content comprising a plurality of scenes each with corresponding metadata;
access a viewer profile of the secondary viewer, wherein the viewer profile is stored in the memory;
determine that the secondary viewer is present with the primary viewer during the providing of the content;
determine a genre match score for the content based on the viewer profile of the secondary viewer indicating a genre preference of the secondary viewer;
modify at least one of the plurality of scenes based on the determined genre match score for the content and the genre preference of the secondary viewer; and
provide the modified at least one of the plurality of scenes for consumption while the secondary viewer is present with the primary viewer.

12. The system of claim 11, wherein the control circuitry is further configured to:
determine the secondary viewer is no longer present for the providing of content; and
in response to determining that the secondary viewer is no longer present, provide the content for consumption while no longer providing the one of the plurality of modified scenes for consumption.

13. The system of claim 11, wherein the control circuitry is configured to modify at least one of the plurality of scenes based on the determined genre match score for the content and the genre preference of the secondary viewer by:
determining whether the genre match score is below a predetermined threshold; and
in response to determining that the genre match score is below the predetermined threshold:
accessing scene metadata for one of the plurality of scenes.

14. The system of claim 11, wherein the control circuitry is further configured to generate a play bar that indicates when the at least one of the plurality of modified scenes will be implemented.

15. The system of claim 11, wherein the control circuitry is further configured to access a viewer profile of the primary viewer, wherein the viewer profile of the primary viewer identifies the content as preferred, and wherein the control circuitry is configured to provide the at least one of the plurality of modified scenes by providing the at least one of the plurality of modified scenes from the content based on the viewer profile of the secondary viewer and the viewer profile of the primary viewer.

16. The system of claim 11, wherein the control circuitry is configured to modify at least one of the plurality of scenes by removing a portion of the content.

17. The system of claim 11, wherein the control circuitry is configured to modify at least one of the plurality of scenes by accessing additional content and adding the additional content to the content.

18. The system of claim 11, wherein the control circuitry is configured to modify at least one of the plurality of scenes by altering or removing explicit language.

19. The system of claim 11, wherein the control circuitry is configured to modify at least one of the plurality of scenes by reordering portions of the content.

20. The system of claim 19, wherein the control circuitry is further configured to reorder portions of the content by prioritizing portions of the content having a particular character or particular location, based on the viewer profile of the secondary viewer.

* * * * *